United States Patent [19]

Li

[11] 4,075,846
[45] Feb. 28, 1978

[54] THERMAL ENGINE WITH ENTRAPPED WORKING MEDIUM

[75] Inventor: Yao Tzu Li, Lincoln, Mass.

[73] Assignee: Massachusetts Institute of Technology, Cambridge, Mass.

[21] Appl. No.: 683,167

[22] Filed: May 4, 1976

[51] Int. Cl.² .............................................. F03G 7/06
[52] U.S. Cl. .................................................... 60/527
[58] Field of Search .......................... 60/527, 528, 529

[56] References Cited

U.S. PATENT DOCUMENTS

| 3,303,642 | 2/1967 | Lee ...................................... 60/527 X |
| 3,321,908 | 5/1967 | Katchalsky ............................. 60/527 |

*Primary Examiner*—Allen M. Ostrager
*Attorney, Agent, or Firm*—Arthur A. Smith, Jr.; Robert J. Horn, Jr.

[57] ABSTRACT

A thermal engine with entrapped working medium is a device with a principle element in the form of a continuous yieldable belt whose tension and length are responsive to temperature due to the property of the working medium entrapped by the belt. This yieldable belt is then wrapped in sequence over several rollers which are coupled together rigidly by suitable mechanical means to give differential speeds among the rollers. Driven in this manner the yieldable belt will undergo cyclic change in tension and stretch while passing over the rollers in sequence. When heat is applied and removed in proper phasing with the cyclic variation of the mechanical properties exhibited by the belt and the entrapped working medium, the device will act as an engine with adequate power output at the shaft coupled to one of the rollers.

9 Claims, 17 Drawing Figures

 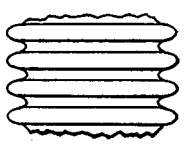  
FIG. 7   FIG. 8   FIG. 9   FIG. 10
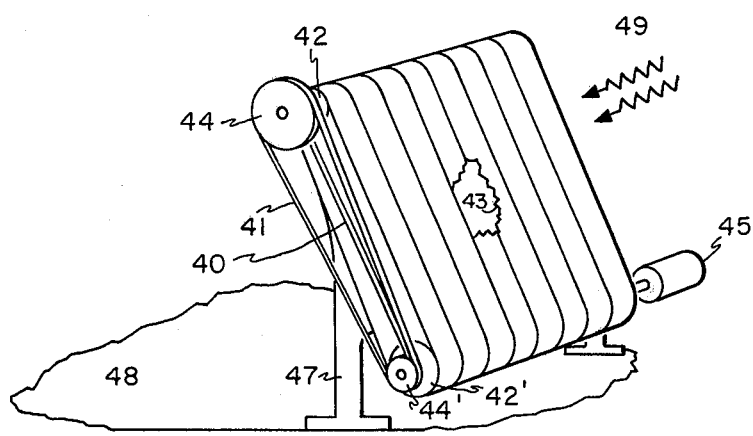
FIG. 11
 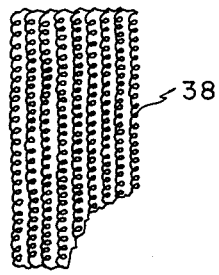
FIG. 12   FIG. 13

THERMAL ENGINE WITH ENTRAPPED WORKING MEDIUM

PRIOR ART

This present invention relates to a class of engines in which the working medium is entrapped as an integral part of the engine. This is different from conventional engines wherein the working media such as gases and vapors are brought in and out of the engine under a cyclic arrangement to perform the mechanical work in response to the thermal energy input. This cyclic movement of the working media also serves the function of conveying the thermal energy in and out of the engine. In the case of steam power, it is impressive to see the stupendous size of the boiler condenser and cooling tower in comparison with the compact turbine. The beauty and pollution problem of the internal combustion engine rest largely in its ability to dump the waste heat as well as the working media out into the atmosphere after each use.

The reason for the disparity in the physical size of the equipment used for heat conveyance and for thermal conversion is that it is possible to make the thermal conversion in a compact manner if the thermal energy is available in a concentrated form, i.e. at high temperature, whereas there is no known way for conveying the heat in an equally effective manner.

Because of the cult of tradition, there is a tendency to utilize the same power generating process designed for high density heat in applications involving low density heat. Typically the process may involve the compacting of the heat energy from the source, having it conveyed to the working medium near the power plant, and then having it conveyed once again to the heat sink after the completion of the thermal conversion.

As an example, proposals for utilizing the thermal gradient of the sea quite often involve pumping the sea water from one depth to heat some working medium, such as ammonia, to drive a turbine. The exhausted ammonia will then be cooled by another stream of water pumped from the sea at a greater depth (a study by Lockheed Missiles and Space Co. Inc. under Contract C937 to the N.S.F./RANN Program). Likewise, a solar power system may involve an array of radiant heat collectors with molten salt as the heat conveying medium, which is then used to generate steam to drive a turbine. The steam would then be condensed by a water cooling tower or its equivalent. Thus, the cost build-up of these systems is not in the engine itself, but in the peripheral equipment needed for conveying the heat.

After reviewing the conventional scheme with recognition of the distinctive parameters involved in thermal conversion and thermal conveyance, the following question may be raised: why not eliminate the separate stages of thermal conveyance so that the heat collection and disposal by the working medium are combined with the function of thermal conversion of the engine? Thus, the working medium is to be entrapped with the engine to be exposed to the heat source and sink while the conversion takes place.

Having thus introduced the objectives, the following figures will be used to give a clear illustration of the working principle of my invention in its various forms.

DRAWINGS

FIG. 1 A schematic diagram of a thermal engine with entrapped medium.

FIG. 2 Sectional view of a typical yieldable belt with entrapped working medium.

FIG. 3 Face view of FIG. 2.

FIG. 4 Side view of one cell entended at low temperature.

FIG. 5 Side view of one cell contracted at high temperature.

FIG. 6 Variation of arrangement of the roller stations.

FIG. 7 Side view of bellows-like cell structure for yieldable belt.

FIG. 8 Face view of FIG. 7.

FIG. 9 Side view of corrugated yieldable belt.

FIG. 10 Face view of FIG. 9.

FIG. 11 A solar engine illustrated with a ribbon-type yieldable belt.

FIG. 12 Side view of coil spring-type yieldable belt.

FIG. 13 Face view of yieldable belt with coil springs.

FIG. 14 End view of FIG. 15.

FIG. 15 A section of a thermal engine with entrapped working medium for submerging application.

FIG. 16 A layout of an ocean thermal energy conversion with entrapped working medium.

FIG. 17 Top view of FIG. 16.

BASIC OPERATING PRINCIPLE OF THE INVENTION

FIG. 1 shows a typical example of an engine with an entrapped working medium, where member 1 represents the framework supporting four rollers 3, 4, 5, 6 and four sprockets 7, 8, 9, 10 rigidly attached respectively to the rollers. An unyieldable chain 11-12-13-14 is used to couple the four sprockets 7, 8, 9, 10 together to move at the same chain speed as shown by the arrow near the numeral 11. A yieldable belt 15-16-17-18 is used to wrap around the four 7, 8, 9 7,8,9 and 10. The working medium 26 for the engine is carried by the yieldable belt in cell 23 as shown in FIG. 2.

The centerline of FIG. 2 represents the yieldable belt 15-16-17-18. A typical construction of the yieldable belt may involve cables 19 and 20 weaving over T-shaped cross members 21–24 and 22–25. Sandwiched between each pair of the cross members is a working medium cell 23 which entraps the working medium 26.

Figure 4:
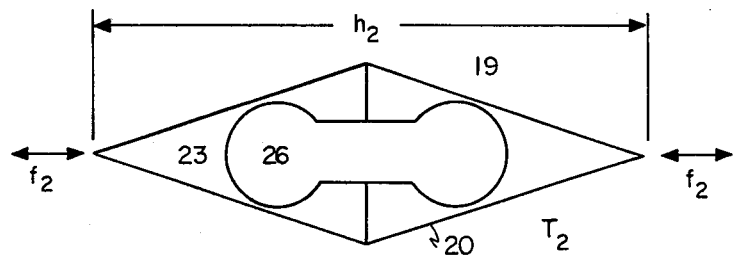
FIGS. 4 and 5 illustrate the dimensional change of the cell and the belt under the influence of temperature changing from $T_2$ in FIG. 4 with the corresponding unit sectional belt length $h_2$ to $T_1$ in FIG. 5 with unit sectional belt length $h_1$.
Figure 5:
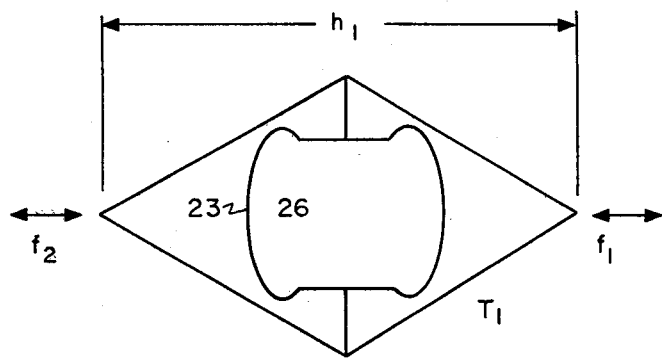

The force vectors $f_2$ and $f_1$ shown in FIGS. 4 and 5 represent the resultant change in force due to temperature change if the dimension of the sections is held unchanged.

Returning back to FIG. 1, the four rollers 3, 4, 5 and 6 are shown to have the same radius $r$ whereas the four sprockets 7, 8, 9 and 10 are shown to have different radii , $b$, $c$ and $d$ respectively. The purpose of the chain and the various sprockets is, therefore, to drive the rollers 3, 4, 5, 6 at differential speeds which would therefore stretch the yieldable belt differentially between the various rollers. Suitable detents may be incorporated on the surface of the rollers to improve the grip of the belt by the roller.

Figure 1:
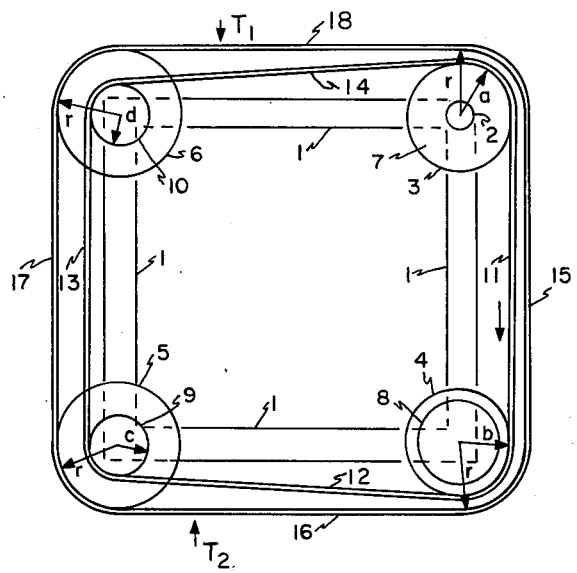
Figure 2:
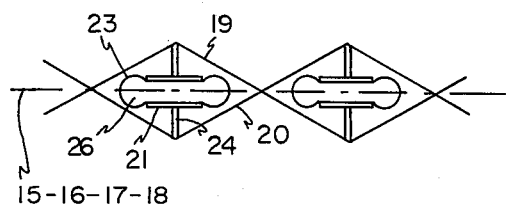
Figure 3:
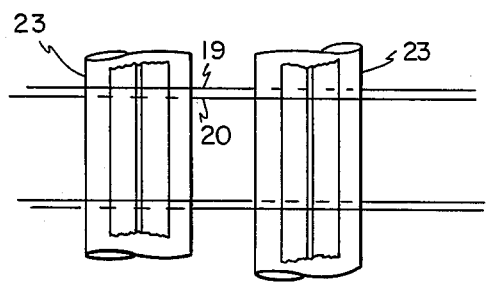
FIG. 3 shows the face view of the belt illustrating the breadth of the belt.

Those skillful in mechanical design will see the many possible methods for achieving rigid differential speed couplings for the various rollers other than chains and sprockets. Likewise, the number of stations for the rollers and sprockets can be as low as two and as high as is justified from the need of the operation as described in the following paragraphs:

To illustrate the operating principle of this engine as shown in FIG. 1, it is asumed that shaft 2 of roller 3 is the output shaft. Radii $a = b > c = d$. Temperature $T_1 > T_2$.

The starting torque can be examined by holding shaft 2 stationary and thereby freezing all rollers through the coupling of the non-yieldable chain 11-12-13-14.

The force experienced by the yieldable belt section 18 under the influence of temperature $T_1$ is $f_1$, which produces a torque $M_3$ upon roller 3 and shaft 2 such as $$M_3 = +f_1 r \tag{1}$$

where the plus sign represents a counterclockwise direction.

The same force $f_1$ of belt 18 acting upon roller 6 will produce a moment upon roller 6. This moment will be transmitted by sprocket 10, chain 14, and sprocket 7 to shaft 2 as $M_6$ where $$M_6 = -f_2 r a/b = -f_2 r \tag{2}$$

The effect of $T_2$ upon belt 16 will produce moments $M_4$ and $M_5$ upon shaft 2 by rollers 4 and 5 respectively with $$M_4 = -f_2 r \, a/b = -f_2 r \tag{3}$$

$$M_5 = f_2 r \, a/c = f_2 r \, a/d \tag{4}$$

The total torque $M_2$ at shaft 2 is therefore $$M_2 = M_3 + M_6 + M_4 + M_5$$

$$= r [f_1(1 - a/d) - f_2(1 - a/d)]$$

$$= r [(f_1 - f_2)(1 - a/d)] \tag{5}$$

This is a value valve indicating a clockwise torque as shown by the arrow marked on roller 3.

In the above illustration the effects of belt sections 15 and 17 are not considered because of the symmetrical conditions as assumed.

The terminal speed of this device can be determined by assuming that the length of the vertical members of FIG. 1 are very short in comparison with that of the horizontal members so that all contraction and expansion of the yieldable belt occurs in these horizontal sections. Thus, the cells will enter into one end of the upper belt 18 with the lower temperature $T_2$ and will build up to temperature $T_1$ in $t$ sec. with the corresponding shrinking rate per cell section of $$S = \frac{h_1 - h_2}{t} \tag{6}$$

Assuming also that there are N cells in belt 18 so that the total shrinking rate of belt 18 is $$S = N \left( \frac{h_1 - h_2}{t} \right) \tag{7}$$

On the other hand, the differential speed of rollers 6 and 3 is $$q = Vr \left( \frac{1}{d} - \frac{1}{d} \right) \tag{8}$$

with roller 6 moving faster than roller 3 and corresponding to the shrinking of belt 18 when they are turning clockwise. Thus, the stabilized terminal speed V can be determined by equating S and $q$, indicating zero torque, i.e.

$$Vr \left( \frac{1}{d} - \frac{1}{a} \right) = N \left( \frac{h_1 - h_2}{t} \right) \tag{9}$$

$$V = \frac{N}{rt} \frac{(h_1 - h_2)}{\left( \frac{1}{d} - \frac{1}{a} \right)}$$

THE CYCLIC NATURE OF THE ENTRAPPED WORKING MEDIUM

The illustration given above represents a simple version of the general concept in which the working medium entrapped in each cell goes through a cyclic change. The diameter ratio at each station may be varied according to the cyclic requirement of the working medium during that section of the yieldable belt moving between two stations. For instance, if the two vertical members of FIG. 1 are quite long and it is desirable to allow dimensional change in these sections, it would be desirable to make the sprocket radii such as $a > b > c$ and $a > d > c$, so that dimensional change would take place in all four sections between rollers 3 and 5 as the two extreme stations.

Figure 6:
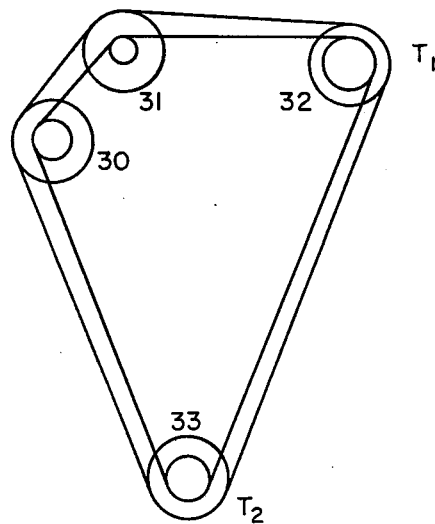
Figure 14:
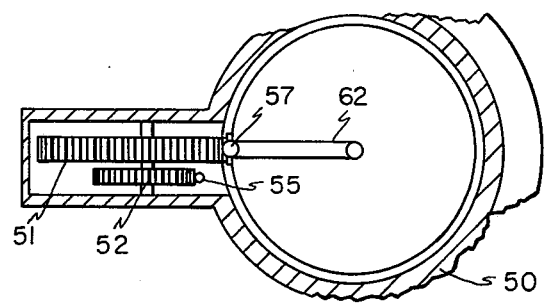

To allow for more cyclic change than is possible through the simple compression and expansion of FIG. 1, the stations may be arranged as shown in FIG. 6, where fast compression between stations 30 and 31 may be introduced before the working medium is subjected to the heating cycle between stations 31 and 32. This is then followed by the long expansion and cooling cycle between stations 32 and 33. This hypothetical cyclic arrangement is used here only to illustrate the possible flexibilities.

Schemes such as FIG. 1 and 6 can be used to generate power with the differential temperature of the sea. For this type of application the pressure change as function of depth becomes another set of parameters, and should therefore be allowed in the design. It is to be noted, however, that without temperature gradient, pressure along would be of no use for power generation, but the combination of temperature and pressure gradients may present a different cyclic function from the situation where there is no pressure gradient. A scheme to eliminate the pressure effect will be introduced in the discussion of FIG. 15.

OTHER FORMS OF THE YIELDABLE BELT WITH ENTRAPPED WORKING MEDIA

FIG. 7 and 8 show a yieldable belt constructed with a pair of corrugated sheets 34 and 35 fused together at seams 36 to entrap working medium 26 in the resultant cells. The edges of the sheets are jointed together in a scalloped edge 37 to allow for freedom to expand. The general property of this belt behaves like a flattened bellows and can therefore be replaced by a string of bellows. In its normal state, this belt contracts to its shortest length due to the elastic property of the sheet.

Heat tends to expand the working medium and thereby, to stretch the length of the belt.

FIGS. 9 and 10 show a belt made of corrugated bimetal channels 37 and 37' linked together, facing each other alternately. Again, the normal state of this belt is to be contracted to its shortest length elastically.

FIG. 11 shows a belt in the form of a group of ribbons 43 made of a nickel-titanium-iron alloy known as 55-Nitinol.* This particular material has an entrapped grain structure with a built in dimensional memory which is triggered by temperature. Thus, at a temperature below a certain critical value, the material is stretchable with a low tensile strength. When the material is subsequently heated to a temperature higher than the critical temperature, it will contact to its original length with a higher tension. The net result will be to convert some of the heat energy into mechanical energy considerably more efficiently than by the thermal expansion of ordinary metal (including bimetal).

*Buehler W. J., Wiley, R. C., and Wang, F. E.: Nickel-Base Alloys, Patent No. 3,174,851, March 23, 1965.

The same material can be made into a corrugated belt as shown in FIGS. 9 and 10, replacing the bimetal channels.

FIGS. 12 and 13 show another method for using the Nitinol material by having it formed into coil springs 38 and bundled into a sheet.

For Solar Heat Applications

FIG. 11 shows a typical arrangement for using this type of engine in the form of a panel for collecting solar energy, 49. In particular, the panel is represented by a yieldable belt made of Nitinol ribbons 43, but it is obvious that all other forms of the yieldable belts discussed earlier are equally applicable. The framework is represented by 40, anchored to the ground by bracket 47. The non-yieldable cable is represented by 41 looping over sprockets 44 and 44' to drive the rollers 42 and 42'. The panel is set in proper orientation so that it faces the solar radiation 49 squarely. A reflector 48 is placed on the ground and shaded from the sun so that heat from the lower side of the panel will be radiated out into space as one form of cooling for that section of the yieldable belt. The surface of belt 43 is coated with black or otherwise suitably treated to increase the radiation coefficient. With heat applied to one side and rejected from the other, the system will rotate in order to drive a load such as an electric generator 45.

For Deep-Submerged Applications

Figure 15:
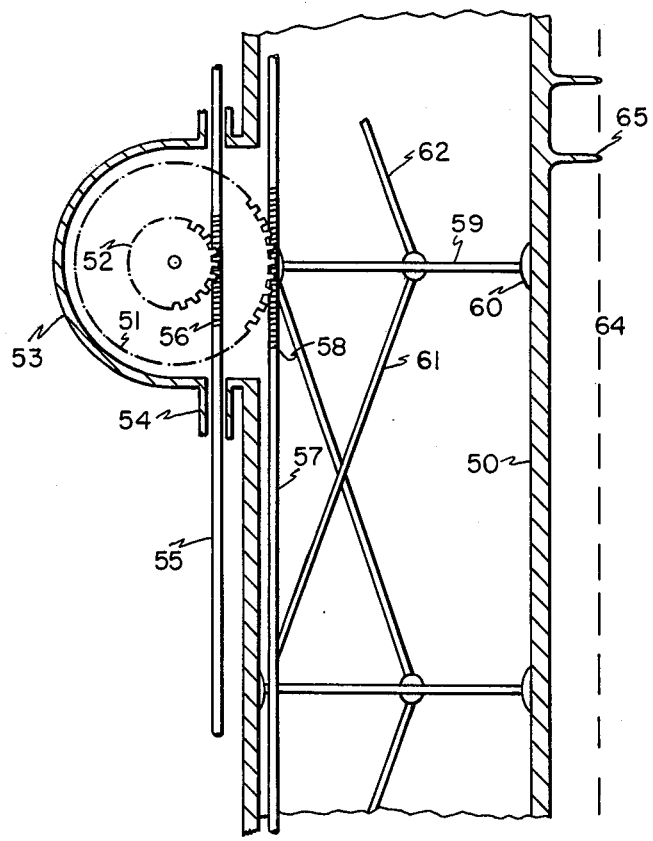

FIG. 15 shows one alternate scheme to that of FIG. 1, with the working medium contained inside a tube. This configuration would pack a larger quantity of working medium in the same general external confinement. It would also protect the working medium from the effect of external pressure, as would exist in deep-submerged applications.

The framework of this system is represented in FIG. 15 by the shell 50, which has a smooth, circular inside surface 66 of uniform diameter. The structure is strong enough to stand the pressure of the water 64. On the outside of the structure, fins 65 may be incorporated to improve thermal conductivity.

Cable 57 with cleats 58 engaging with roller 51 represents the yieldable belt which can be made of coil springs, fiberglass-reinforced rubber or the equivalent. The property of this belt is that it should have a stiffness comparable, or less than, the stiffness of the working medium trapped between and acting upon the baffle discs 59. It should also be pretensioned so that at no time will the net tension become negative. For instance, in the compression cycle the pressure build up of the working medium derives from the release speed of the yieldable belt or cable by the aft roller being faster than the taking up by the preceeding one. At this point the compression of the entrapped working medium is accomplished by the initial tension of the yieldable cable.

52 of FIG. 15 represents the sprocket gear engaged by the rigid cable 55 through cleats 56 to control the roller speed ratio between stations. It should be noted that the number of stations depends upon the mechanical design to distribute load as well as to control speed variations. Furthermore, the speed ratio of successive stations can be changed progressively by a series of gear pairs, with each pair coupled by one cable loop. Likewise, the speed variation can be accomplished by the diameter difference of the roller.

53 and 54 of FIG. 15 are casings for the roller and the nonyieldable cable which provide leak-proof compartments.

Baffle plates 59 are provided with seals 60 and supports 61 and 62.

The arrangement of FIG. 15 provides one set of yieldable cables and one set of speed controlling nonyielding cables for simplicity in presentation. Multiple sets of these cables deployed around the tube could be attractive for large installations.

Figure 17:
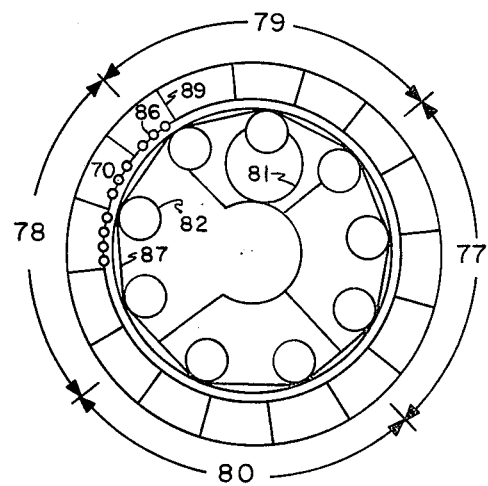
Figure 16:
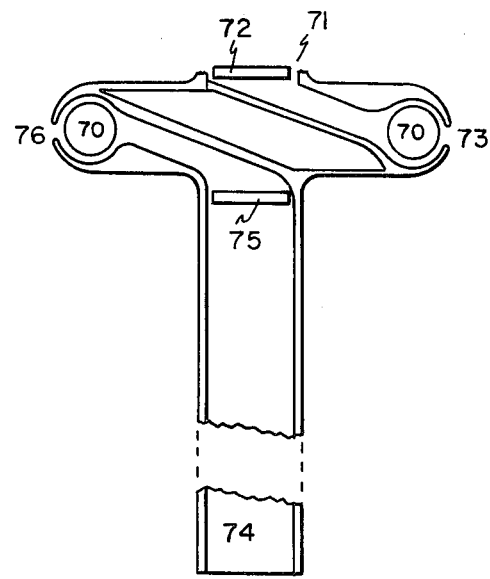

FIG. 16 shows one plausible arrangement involving the use of surface water of the ocean as the heat source, and cold water taken from below 1,000 feet as the heat sink. FIG. 17 shows the top view of the same system. In these two figures, 70 represents the tubular chamber of the engine arranged in a horizontal, toroidal shape. Surface water is admitted through the top inlet 71 by pump 72 and is discharged at 73 to heat the engine at section 77. Cold water is admitted through a long, deep reaching pipe 74 by pump 75 and is discharged at 76 to cool engine section 78. Sections 79 and 80 of the engine are provided for expansion and compression respectively. Non-yieldable cable 87 make straight line sections between sprockets 82. A yieldable cable with rollers 86 will ride around the circular track inside the toroidal chamber. Baffle plate 89 will ride smoothly around inside the toroidal chamber. 81 represents the the generator driven by the engine.

Having thus described my invention, I claim:

1. A thermal engine comprising a frame, a first set of rollers coupled to said frame, a non-yieldable drive system coupled to each roller of said first set to cause the rollers to rotate with fixed speed ratios, a second set of rollers having rollers in fixed relationship to said first set of rollers, a continuous yieldable belt coupled to each roller of said second set, at least one of said rollers being of a different diameter, at leat one of the rollers being coupled to a shaft to deliver mechanical power as an output, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in the tension, the changes in tension within portions of said belt in combination with the non-yieldable drive coupled to the rollers of the first set producing a mechanical energy output at said output shaft.

2. A thermal engine comprising a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in length and tension, an output shaft coupled to at least one of said rollers, the changes in tension within portions of said belt in combination with the non-yieldable drive producing a mechanical energy output at said output shaft, said belt being comprised of a set of cables serving as the longitudinal members, said cables being woven about a set of cross members, a set of inflatable cells containing thermoresponsive material operably connected to said cross members, appropriate temperature variation applied to said cells causing expansion of the working medium, expansion of said working medium causing the tension and length of said belt to vary.

3. A thermal engine comprising a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in length and tension, an output shaft coupled to at least one of said rollers, the changes in tension within portions of said belt in combintion with the non-yieldable drive producing a mechanical energy output at said output shaft, said belt being comprised of a plurality of bellows-like cells, said cells containing a thermoresponsive medium, expansion of said cells causing elongation of the length of the belt under the constraint of the elastic property of the cells.

4. A thermal engine comprising a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in length and tension, an output shat coupled to at least one of said rollers, the changes in tension within portions of said belt in combination with the non-yieldable drive producing a mechanical energy output at said output shaft, said belt being comprised of a sequence of lateral channels made of laminations of sheets with dissimilar thermal expansion characteristics, said channels being linked together to provide said changes in length and tension in response to temperature variation.

5. A thermal engine comprising a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in length and tension, an output shaft coupled to at least one of said rollers, the changes in tension within portions of said belt in combination with the non-yieldable drive producing a mechanical energy output at said output shaft, said belt being fabricated from material having a mechanical energy storage memory, said memory being triggered by temperature variation about a critical temperature value to provide changes in length and tension in response to temperature variation.

6. A thermal engine comprising a plurality of rollers. at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in tension, a second section of said belt being exposed to the heat sink to cause a different change in length and tension, an output shaft coupled to at least one of said rollers, the changes in tension within portions of said belt in combination with the non-yieldable drive producing a mechanical energy output at said output shaft, said belt being comprised of thin ribbons, said ribbons being fabricated of Nitinol.

7. A thermal engine comprising a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in length and tension, a second section of said belt being exposed to the heat sink to cause a different change in length and tension, an output shaft coupled to at least one of said rollers, the changes in tension within portions of said belt in combination with the nonyieldable drive producing a mechanical energy output at said output shaft, said belt being comprised of a plurality of coil springs, said coil springs changing their length and tension in response to temperature variation.

8. A thermal engine comprisng a plurality of rollers, at least two of said rollers being coupled by a non-yieldable drive system, at least two of said rollers being coupled with a belt, said belt changing its length and tension in response to temperature variation, a heat source, a heat sink of temperature lower than said heat source, a section of said belt being exposed to the heat source to cause a change in length and tension, a second section of said belt being exposed to the heat sink to cause a different change in length and tension, an output shaft coupled to at least one of said rollers, the changes in tension within portions of said belt in combination with the non-yieldable drive producing a mechanical energy output at said output shaft, said belt being comprised of a plurality of coil springs, said coil springs changing their length and tension in in response to temperature variation and being fabricated from Nitinol.

9. A thermal engine comprised of a rigid frame with a closed loop hollow tubular chamber, a plural set of rollers mounted around the loop to form a number of stations, a non-yieldable drive system coupled to the rollers to cause them to rotate with fixed differential speed ratios between stations, one set of the rollers in one station being coupled to a shaft to deliver mechanical power as the output, at least one continuous yieldable cable being coupled to the rollers around the complete loop, a plural set of baffle plates fitting inside the said tubular chamber with adequate seal to form a plural set of subchambers, these said baffle plates being attached to the said yieldable cable, said subchambers being filled with a suitable working medium, said working medium being trapped by the said baffle plate to move inside the said tubular chamber together with the yieldable cable coupled to the plural rollers, the said differential speed of the roller being set to give the said working medium a cyclic pressure and volumetric change around the said loop, a section of the said loop being exposed to a heat source, another section being exposed to a heat sink with a lower temperature than the heat source, the said cyclic change of the physical conditions of the working medium being matched with the location of the said heat source and heat sink so that a net mechanical output can be generated at the said output shaft.

* * * * *